United States Patent
Rautio

(10) Patent No.: US 11,951,644 B2
(45) Date of Patent: Apr. 9, 2024

(54) METHOD FOR OPERATING A SAWLINE AND A SAWLINE

(71) Applicant: VEISTO OY, Mäntyharju (FI)

(72) Inventor: Markku Rautio, Mäntyharju (FI)

(73) Assignee: VEISTO OY, Mäntyharju (FI)

( * ) Notice: Subject to any disclaimer, the term of this patent is extended or adjusted under 35 U.S.C. 154(b) by 1335 days.

(21) Appl. No.: 16/469,430

(22) PCT Filed: Nov. 23, 2017

(86) PCT No.: PCT/FI2017/050814
§ 371 (c)(1),
(2) Date: Jun. 13, 2019

(87) PCT Pub. No.: WO2018/109263
PCT Pub. Date: Jun. 21, 2018

(65) Prior Publication Data
US 2019/0321997 A1  Oct. 24, 2019

(30) Foreign Application Priority Data

Dec. 14, 2016 (FI) ...................................... 20165964

(51) Int. Cl.
*B27B 31/06* (2006.01)
*B23Q 17/20* (2006.01)
(Continued)

(52) U.S. Cl.
CPC .............. *B27B 31/06* (2013.01); *B23Q 17/20* (2013.01); *B23Q 17/2409* (2013.01);
(Continued)

(58) Field of Classification Search
CPC . B27M 1/08; B27B 1/00; B27B 1/002; B27B 1/007; B27B 31/00; B27B 31/06
See application file for complete search history.

(56) References Cited

U.S. PATENT DOCUMENTS 3,871,258 A    3/1975  Hum
4,546,440 A   10/1985  Palmberg
(Continued)

FOREIGN PATENT DOCUMENTS

CA       2004279 C    4/1996
FI        125335 B    8/2015
(Continued)

OTHER PUBLICATIONS

International Search Report, issued in PCT/FI2017/050814, dated Mar. 15, 2018.
(Continued)

*Primary Examiner* — Matthew Katcoff
(74) *Attorney, Agent, or Firm* — Birch, Stewart, Kolasch & Birch, LLP

(57) ABSTRACT

In a method for operating a sawline for logs, the sawline including a conveyor for conveying a log in the sawline, and a processing apparatus for processing the log, the log is fed into the sawline, the log is conveyed onwards in the longitudinal direction in the sawline, the overall length of the log is determined, and the log is guided into the processing apparatus, with which the log is processed at the same time, when the log is conveyed onwards in the sawline. The length of the part of the log that is outside the processing apparatus is determined with a camera apparatus, and the location of the end of the log in the processing apparatus is determined on the basis of the overall length of the log and on the basis of the length of the part of the log that is outside the processing apparatus.

12 Claims, 1 Drawing Sheet

(51) Int. Cl.
*B23Q 17/24* (2006.01)
*G01B 11/04* (2006.01)

(52) U.S. Cl.
CPC ........ *G01B 11/043* (2013.01); *B23Q 2717/00* (2013.01); *G05B 2219/31268* (2013.01); *G05B 2219/45144* (2013.01)

(56) References Cited

U.S. PATENT DOCUMENTS

| | | |
|---|---|---|
| 5,447,186 A | 9/1995 | Achard et al. |
| 6,474,379 B1 | 11/2002 | Mellor et al. |
| 2005/0161118 A1 | 7/2005 | Carman et al. |
| 2005/0183554 A1* | 8/2005 | Reinbold ............. B23D 59/002 83/403.1 |
| 2009/0255607 A1 | 10/2009 | Barker |
| 2010/0011926 A1 | 1/2010 | Murakami et al. |
| 2010/0201118 A1 | 8/2010 | Anton et al. |
| 2010/0300256 A1 | 12/2010 | Loewe et al. |
| 2014/0130645 A1 | 5/2014 | Takano et al. |
| 2014/0238546 A1* | 8/2014 | Barker ............... B27B 31/06 144/357 |
| 2014/0251499 A1* | 9/2014 | Barker ............... B27B 1/007 144/402 |
| 2014/0293048 A1 | 10/2014 | Titus et al. |
| 2016/0346851 A1 | 12/2016 | Maki-Haapoja |
| 2018/0099369 A1* | 4/2018 | Eastling ............. B23Q 17/2409 |

FOREIGN PATENT DOCUMENTS

| | | |
|---|---|---|
| JP | 49-109506 A | 10/1974 |
| JP | 2010-23186 A | 2/2010 |
| JP | 2010-52352 A | 3/2010 |
| WO | WO 94/24515 A1 | 10/1994 |
| WO | WO 2006/126952 A2 | 11/2006 |

OTHER PUBLICATIONS

Written Opinion of the International Searching Authority, issued in PCT/FI2017/050814, dated Mar. 15, 2018.

* cited by examiner

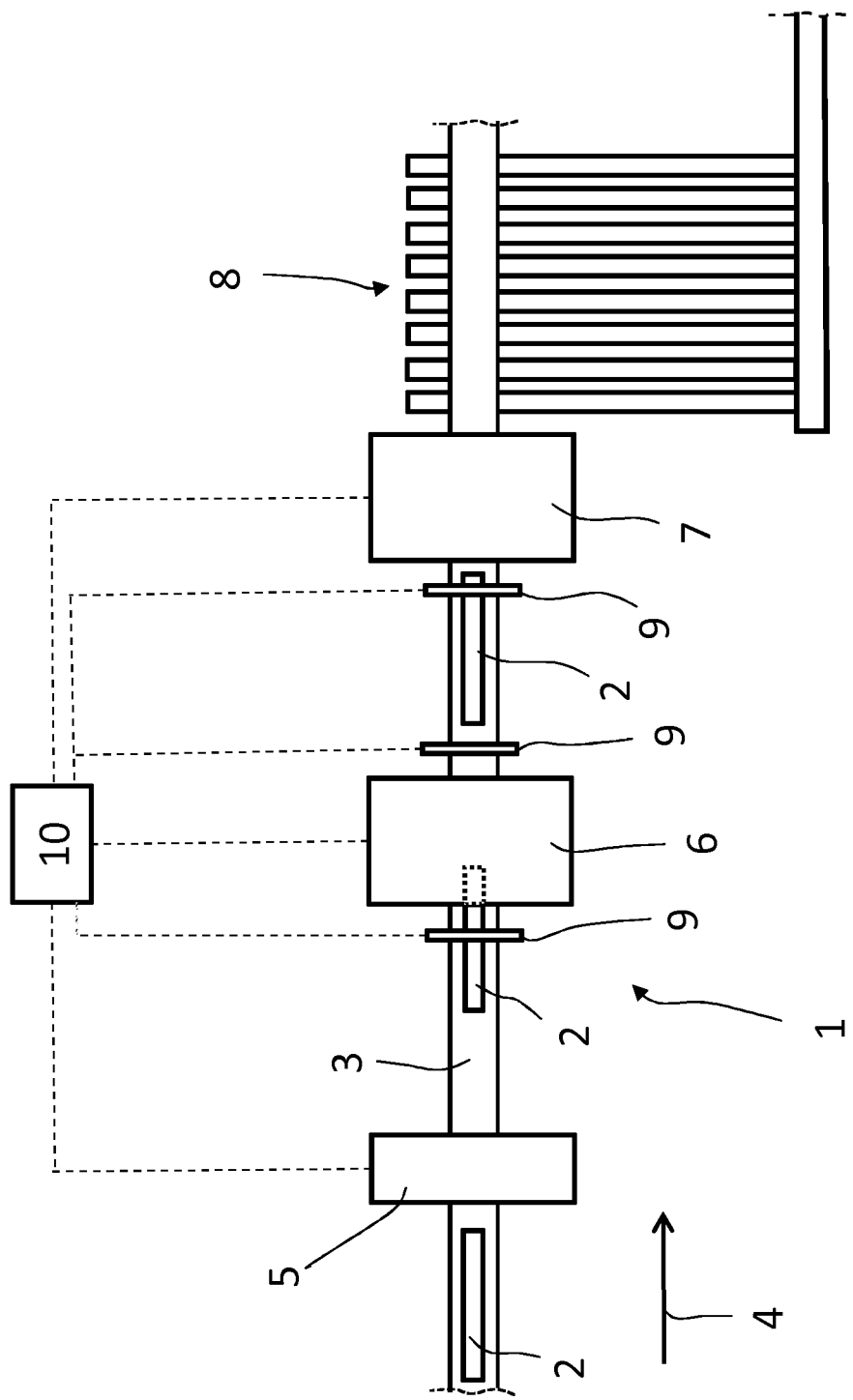

METHOD FOR OPERATING A SAWLINE AND A SAWLINE

The object of the present invention is a method according to the preamble of claim 1 for operating a sawline. The object of the invention is also a sawline according to the preamble of claim 7.

The invention relates to sawlines operated in sawmills, in which sawlines logs are sawn into boards and/or deals. A sawline comprises apparatuses for processing logs, such as a chipping canter, with chipping blades of which sides of the log are leveled by chipping, a sawing unit, with which the log is sawed, and edging blades for leveling sides of edge boards. Logs are conveyed in the sawline onwards in the longitudinal direction by conveyors and feeder rollers.

There is a measuring device at the beginning of the sawline, with which measuring device log geometry is determined. The measuring device is connected to the control unit, which controls processing apparatuses and blades and feeder rollers connected to processing apparatuses. The conveying of the log is monitored with photo cells so that the blades and/or feeder rollers of the processing apparatuses can be moved to the desired position at the right time.

A problem in controlling with photo cells is that it is difficult to get the photo cells to operate inside the processing device in a reliable manner. For example, chips and sawdust coming from the log during processing can drift in front of the photo cells and thus prevent their functioning. Because of this, photo cells have to be placed outside the processing apparatus, wherein the distance between a photo cell and a blade and/or feeder rollers inside the processing apparatus that are to be controlled will become large, which makes it more difficult to convey the blade and/or the roller to the desired position at the right time, as the exact location of the end of the log inside the processing apparatus is not known. This for one might cause defects in quality of sawn wood, and malfunctions in the processing apparatus. This problem can be reduced by placing several photo cells next to each other before the processing apparatus and after it over the whole length of the log, wherein the location of the end of the log inside the processing apparatus can be determined more accurately, when the overall length of the log is known. A disadvantage of this solution is that there has to be a large amount of photo cells, which complicates the automation of a sawline and thus increases the costs. Moreover, a large amount of photo cells reduces the overall reliability of the system and the usability of it.

The aim of the present invention is to achieve a method and a sawline, with which the aforementioned problems can be reduced.

The aim of the invention is achieved with a method according to claim 1 and with a sawline according to claim 7.

In the method according to the invention a log is fed into the sawline, the log is conveyed onwards in the sawline in the longitudinal direction. The overall length of the log is determined, and the log is guided into the processing apparatus, with which the log is processed and, at the same time, conveyed onwards in the sawline. The length of the part of the log outside the processing apparatus is determined with a camera apparatus, and the location of the end of the log in the processing apparatus is determined on the basis of the overall length of the log and on the basis of the length of the part of the log that is outside the processing apparatus.

The sawline according to the invention comprises conveying means for conveying a log in the longitudinal direction in the sawline, a processing apparatus for processing the log at the same time, when the log is conveyed onwards in the sawline, a measuring apparatus for determining the overall length of the log. The sawline comprises a camera apparatus for determining the length of the part of the log that is outside the processing apparatus, and a control system, which is arranged to receive the measuring data of the overall length of the log and the measuring data of the camera apparatus, and to determine the location of the end of the log in the processing apparatus on the basis of them.

Significant advantages are achieved by means of the invention.

The length of the part of the log that is outside the processing apparatus can be determined accurately on the basis of the camera measurement. When the overall length of the log and the length of the part that is outside the processing apparatus are known, the location of the end of the log inside the processing apparatus can be determined very accurately Then blades and/or rollers inside the processing apparatus can be conveyed to the desired position at the right time. Consequently, the processing apparatus can be controlled in a timely manner, and thus the processing apparatus can be made to operate more reliable than in traditional controlling with photo cells. Moreover, the amount of photo cells in connection with the processing apparatus can be reduced, due to which the automation of the sawline can be simplified. Also the overall length of the log can be determined with the camera, when the log is outside the processing apparatus.

The camera apparatus can be a camera of a machine vision equipment, for example, with which logs in the sawline are imaged. The machine vision equipment comprises necessary software and hardware for processing the image produced by the camera, and for determining the desired data from the image produced by the camera.

The camera apparatus can be utilized also for other purposes of use, such as for alarms in the sawline, maintenance, personal safety supervision and fire alarms.

In the following, the invention will be described in more detail by the aid of examples with reference to the attached drawing, which presents top view of the sawline according to one embodiment of the invention.

The drawing presents the sawline 1, with which logs 2 are sawn into boards and/or into deals. The sawline 1 comprises conveying means, e.g. one or more conveyors 3 and conveying rollers, for conveying a log 2 in the longitudinal direction in the sawline 1. The conveying direction of the log 2 is marked in the drawing with an arrow 4. The sawline 1 comprises a measuring device 5 for determining dimensions and/or geometry, such as overall length, diameter, conicity, ellipticity and/or crookedness of the log.

The sawline 1 comprises a processing apparatus 6, 7 for processing the log 2 at the same time, when the log 2 is being conveyed onwards in the sawline 1. Typically, the first processing apparatus 6 in the conveying direction 4 of the log is a chipping canter, which comprises cutter heads, which are provided with chipping blades for leveling the opposite sides of the log 2 by chipping. The cutter heads are arranged on the opposite sides of the route of the log 2. The sides of the log 2 can be leveled in the chipping canter 6 only on two opposite sides or on four sides. In connection with the chipping canter 6 there can be a cant saw, with which side boards are sawn from the log 2 after chipping cantering.

The sawline 1 according to the drawing also comprises at least a second processing apparatus 7 for processing the log 2. The second processing apparatus 7 is a sawing unit for sawing the log 2 into boards and/or into deals. The sawline 1 comprises a separating unit 8, which is arranged after the sawing unit in the conveying direction of the log 2. In the separating unit 8 the sawn boards and/or deals are separated from the log 2. The sawing unit 7 comprises circular blades for sawing the log 2.

The processing apparatus 6, 7 comprises a case, inside of which the blades and/or other parts machining the log and/or draw-in rollers and guides connected to them are placed. The log is conveyed through the case. There is a feed opening in the case, through which the log is led into the case. Moreover, there is an outlet opening through which the log is removed from the case.

Typically, the sawline 1 comprises also other apparatuses, such as a rotating device for rotating the log, a second measuring device for measuring dimensions and/or geometry of the log after chipping cantering, and one or more edging units for edging boards.

The sawline 1 comprises one or more camera apparatuses 9 for determining the length of the part of the log that is outside the processing apparatus 6, 7 in a situation where the log 2 is partly in the processing apparatus 6, 7. The camera apparatus 9 determines the length of the part of the log that is outside the case. When the overall length of the log 2 and the length of the part that is outside the processing apparatus, are known, the location of the end of the log 2 inside the processing apparatus 6, 7 can be determined. The camera apparatus 9 has been arranged to determine the length of the part of the log 2 that is outside the processing apparatus 6, 7 in the conveying direction of the log 2 before the processing apparatus 6, 7, and/or after it. If the length of the part of the log 2 that is outside the processing apparatus 6, 7 is determined before the processing apparatus 6, 7 and after it, the location of the front end and the read end of the log 2 inside the processing device 6, 7 can be determined. Moreover, the camera 9 can comprise a distance meter.

The camera apparatus can be a machine vision equipment, which comprises one or more cameras and the necessary software and hardware for processing the image produced by the camera, and for determining the data of the length of the log 2 from the image produced by the camera. With the camera apparatus also the overall length of the log 2 can be determined, when the log 2 is completely outside the processing apparatus 6, 7. The camera is typically placed above the sawline 1 before the processing apparatus and/or after it, or sidewards to the sawline 1. The camera apparatus 9 is placed outside the case of the processing apparatus 6, 7.

The sawline 1 also comprises a control system 10, which is arranged to receive the measuring data of the camera apparatus 9 and/or of the measuring device 5. The control system 10 is arranged to determine the location of the end of the log 2 inside the processing apparatus 6, 7 in the conveying direction 4 of the log 2 on the basis of the measuring data of the camera apparatus 9 and of the measuring data of the overall length of the log 2. The control system 10 is also arranged to control the processing apparatus 6, 7 on the basis of the determined location of the end of the log 2. The processing apparatus 6, 7 comprises blades for processing the log 2, wherein the control system 10 is arranged to control the position of the blades e.g. in the direction of the diameter of the log 2 on the basis of the location of the end of the log 2. Software and other hardware of the camera apparatus 9, with which the length of the log 2 is determined from the image produced by the camera, can be a part of the control system 10.

If the processing apparatus 6, 7 is a chipping canter, the control system 10 is arranged to control the cutter heads of the chipping canter so that the cutter heads move to desired positions at the desired time, when the end of the log 2 is approaching the cutter heads. If the processing apparatus 6, 7 is a sawing unit, the control system 10 is arranged to control the sawing blades, for example circular blades, so that the sawing blades move to the desired positions at the desired time, when the end of log 2 is approaching the sawing blades. If the processing apparatus 6, 7 comprises guiding rollers for guiding the log 2, the control system 10 can be arranged to control also them on the basis of the location of the end of the log 2.

The sawline 1 according to the drawing operates in the following manner. A log 2 is fed into the sawline 1, and the log 2 is conveyed onwards in the sawline 1 in the longitudinal direction. The overall length of the log 2 is determined with a measuring device 5. Moreover, also other dimensions and/or geometry of the log 2, such as diameter, conicity, ellipticity and/or crookedness, are determined with the measuring device 5. The measurement data of the measuring device 5 is transferred to the control system 10.

The log 2 is conveyed to the processing apparatus 6, with which the log 2 is processed at the same time, when the log 2 is conveyed onwards in the sawline 1. The processed log 2 is removed from the processing apparatus 6. Thereafter, the log 2 is conveyed either directly or through other processing and/or machining stages to a second processing apparatus 7, with which the log 2 is processed. If the processing apparatus 6 is a chipping canter, the two opposite sides or four sides of the log 2 are leveled by chipping. If the processing apparatus 6 or the second processing apparatus 7 is a sawing unit, the log 2 is sawn with sawing blades, for example with circular blades, into sawn wood, such as boards and/or deals. Boards are separated by a separating device 8.

The length of the part of the log 2 that is outside the processing apparatus 6, 7 is determined with the camera apparatus 9 at the same time when the log 2 is partly in the processing apparatus 6, 7, and the log 2 is conveyed onwards in the sawline 1. Also the overall length of the log 2 can be determined with a camera apparatus 9, when the log 2 is completely outside the processing apparatus 6, 7. The measuring data produced by the camera apparatus 9 is transferred to the control system 10, with which the location of the end of the log 2 in the processing apparatus 6, 7 is determined on the basis of the overall length of the log 2 and on the basis of the length of the part of the log that is outside the processing apparatus 6, 7. The location of the end of the log 2 in the processing apparatus 6, 7 is determined in the conveying direction 4 of the log.

The length of the part of the log that is outside the processing apparatus 6, 7 is determined with the camera apparatus 9 in the conveying direction of the log 2 before the processing apparatus 6, 7 and/or after it. On the basis of this, the location of the front head and/or the rear end of the log inside the processing apparatus 6, 7 is determined. When the length of the part of the log 2 before the processing apparatus 6, 7 is determined, the location of the front end of the log 2 inside the processing apparatus 6, 7 can be determined. When the length of the part of the log 2 after the processing apparatus 6, 7 is determined, the location of the rear end of the log 2 in the processing apparatus 6, 7 can be determined, respectively. The length of the part of the log 2 that is outside the feed opening and/or outlet opening of the processing apparatus 6, 7, is determined with the camera apparatus 9.

The processing apparatus 6, 7 is controlled on the basis of the location of the end of the log with the control system 10. With the control system 10, the position of the blades of the processing apparatus 6, 7, with which blades the log 2 is machined, is controlled in the direction of the diameter of the log 2 on the basis of the location of the end of the log 2. Then the blades are moved to the desired position at the desired time, when the front end of the log 2 is approaching the blades. If the processing apparatus 6 is a chipping canter, the cutter heads are moved by the control system to the desired positions at the desired time, when the end of the log 2 is approaching the cutter heads. If the processing apparatus is a sawing unit, the sawing blades, for example circular blades, are moved by the control system to the desired positions at the desired time, when the front end of the log 2 is approaching the cutter heads. The blades are moved to the desired positions, when the front end of the log 2 is at a predetermined distance from the blades. After the rear end of the log 2 has passed by the blades, the blades are moved to the desired positions for the next log 2.

The location data of the front end and/or the rear end of the log 2 inside the processing apparatus 6, 7, can additionally or alternatively to the positioning of the blades machining the log 2 be used for the positioning of the feeder rollers and/or other machine components controlling the log, for controlling of the water injection system that cools the blades machining the log 2, for controlling of the compressed air blasting that are used for cleaning, and/or for updating the real-time monitoring view of the user interface of the operator.

There is a security area on the edge of the sawline 1, which security area is observed with the camera apparatus 9, and the observation data is transferred to the control system 10. The security area can be enclosed, and there is no admittance to the area during the operating of the sawline 1. If a person, a non-predefined object, or other object is detected in the security area, an alert is performed and/or the sawline 1 is switched off controlled by the control system 10.

Moreover, the operation of the sawline 1 is observed with the camera apparatus 9, and the observation data is transferred to the control system 10. If it is detected that the sawline 1 operates in an unpredetermined manner, an alert is performed and/or the sawline 1 is switched off controlled by the control system 10.

It is obvious to the person skilled in the art that the invention is not limited solely to the embodiments presented above, but that it can be varied within the scope of the claims presented below.

The invention claimed is:

1. A method for operating a sawline for logs, the sawline comprising a conveyor for conveying a log in the sawline, and a processing apparatus for processing the log, said method comprising the steps of:
   feeding the log into the sawline;
   conveying the log onwards in the longitudinal direction in the sawline;
   determining the overall length of the log;
   guiding the log into the processing apparatus with which the log is processed at the same time, when the log is conveyed onwards in the sawline;
   determining the length of the part of the log that is outside the processing apparatus with a camera apparatus in the conveying direction of the log before the processing apparatus and after the processing apparatus;
   determining the location of a front end and a rear end of the log in the processing apparatus on the basis of the overall length of the log and on the basis of the length of the part of the log that is outside the processing apparatus; and
   controlling the processing apparatus on the basis of the location of the front end and the rear end of the log.

2. The method according to claim 1, wherein the processing apparatus comprises blades for processing the log, and the position of the blades is controlled on the basis of the location of the front end and the rear end of the log.

3. The method according to claim 1, wherein there is a security area on the edge of the sawline, the security area being monitored with the camera apparatus, and if a person, a non-predefined object or other object is detected in the security area, an alert is performed, and/or the sawline is switched off.

4. The method according to claim 1, wherein the operation of the sawline is monitored with the camera apparatus, and if it is detected that the sawline is operating in an unspecified manner, an alert is performed, and/or the sawline is switched off.

5. The method according to claim 2, wherein the length of the part of the log that is outside the processing apparatus is determined by the camera apparatus in the conveying direction of the log before the processing apparatus and after the processing apparatus.

6. The method according to claim 2, wherein there is a security area on the edge of the sawline, the security area being monitored with the camera apparatus, and if a person, a non-predefined object or other object is detected in the security area, an alert is performed, and/or the sawline is switched off.

7. The method according to claim 2, wherein the operation of the sawline is monitored with the camera apparatus, and if it is detected that the sawline is operating in an unspecified manner, an alert is performed, and/or the sawline is switched off.

8. A sawline for logs, comprising:
   a conveyor for conveying a log in the longitudinal direction in the sawline;
   a processing apparatus for processing the log at the same time, when the log is being conveyed onwards in the sawline;
   a measuring device which determines the overall length of the log;
   a camera apparatus which determines the length of the part of the log that is outside the processing apparatus in the conveying direction of the log before the processing apparatus and after the processing apparatus; and
   a control system which receives the measuring data of the overall length of the log and the measuring data of the camera apparatus, and determines the location of a front end and a rear end of the log in the processing apparatus on the basis of the measuring data of the overall length of the log and the measuring data of the camera apparatus; and
   wherein the control system controls the processing apparatus on the basis of the location of the end of the log.

9. The sawline according to claim 8, wherein the processing apparatus comprises blades for processing the log, and the control system controls the position of the blades on the basis of the location of the front end and the rear end of the log.

10. The sawline according to claim 8, wherein there is a security area next to the sawline, the security area being monitored by a camera the camera apparatus, and if a person, a non-predefined object or other object is detected in the security area, the control system performs an alert and/or to switch off the sawline.

11. The sawline according to claim 8, wherein the camera apparatus monitors the operation of the sawline, and if it is detected that the sawline operates in an unpredetermined manner, the control system performs an alert and/or to switch off the sawline.

12. The sawline according to claim 8, wherein the camera apparatus comprises a camera for imaging the log that is to be conveyed in the sawline, and a system for determining the length data of the log from the image produced by the camera.

\* \* \* \* \*